3415X
P. WILLIAMSON.
BEDSTEAD CORDING.
Patented Dec. 6, 1821.
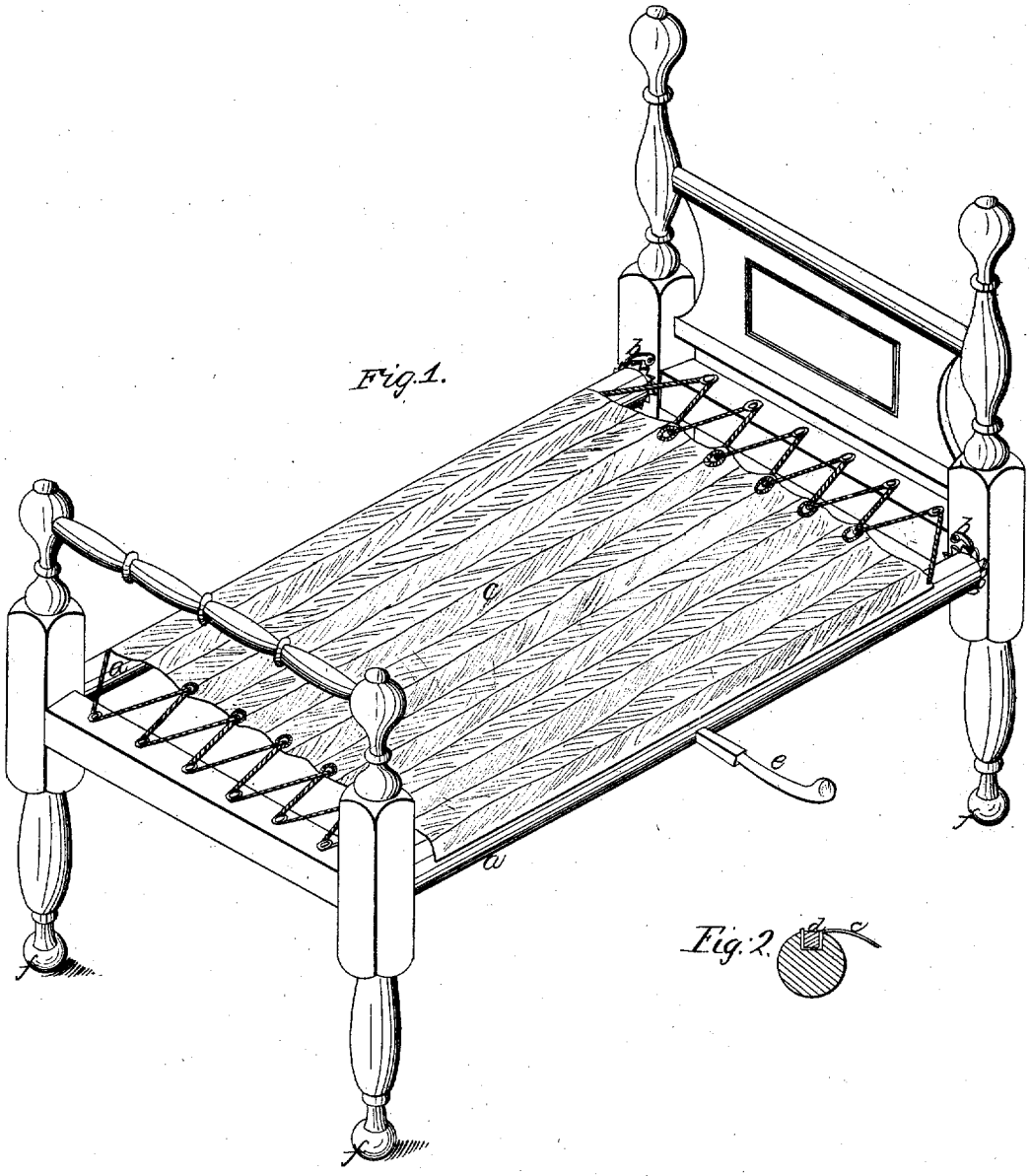
THE NORRIS PETERS CO., PHOTO-LITHO., WASHINGTON, D. C.

3415X

UNITED STATES PATENT OFFICE.

PEREGRINE WILLIAMSON.

BEDSTEAD.

Letters Patent dated December 6, 1821.

The schedule referred to in these Letters Patent, and making part of the same, containing a description in the words of the said PEREGRINE WILLIAMSON himself of his Improvement in Bedsteads.

The main and leading principle in this bedstead which distinguishes it from those in common use consists in the rails being round instead of square, with a ratchet-wheel or catch precisely upon the principle of a windlass. The wheels are screwed to one end of the side and foot rails. The catch for each should be stationed by the post immediately over the wheels as nearly in a horizontal direction as is practicable, as it will thereby act with more certainty proportioned to its increased weight. The other side of the head-rails (which must be stationary) may be tenoned in the usual way or any other method the workman chooses to secure them from turning. To secure the sacking, a groove is made in each of the long or side rails one full inch deep and about half an inch wide, extending to about four inches (more or less) of the extreme ends. To the groove thus formed there must be a slip or tongue fitted loosely to allow for the thickness of the canvas, which measures round and occupies three sides or squares of the slip, to secure which it is driven (similar to a wedge) firm to its place; or it may be glued in, (which is better,) which will render it perfectly secure and immovable. The two revolving rails should have one or more holes, about three-quarters of an inch in diameter, to admit a lever (either wood or iron) of about eighteen or twenty inches long to apply the necessary power to tighten the sacking bottom. Fitted to each lever-hole is a pin with a head something like a common bed-pin, which answers the double purpose of keeping out the bugs and giving the rails a finished appearance. The tenons to those rails (which of course are round) are about two and one-half inches in diameter and about the usual length. The holes for their reception are formed by a common brace and bit of a suitable size. To the head and foot rail the common bed-pins are applied and the sacking bottom attached to each by means of a cord, as is common; but to stretch it tight it becomes only necessary to apply the lever to the two revolving rails and it is immediately effected with the greatest facility. There is also another peculiar distinguishing property in the bedstead, and that is the glass rings or other substance affixed permanently to each post about four inches from the floor, the upper surface of which is moulded in imitation of cut-glass and the under surface perfectly smooth, which glass rings, beside being highly ornamental, serve as an effectual barrier against the approach of bugs. Glass plates may be substituted when the post is made square; or each pedestal may be made to rest permanently upon a ball of glass.

These bedsteads may be put together without screws by making the tenons of a dovetail form, and the cast-iron or other metal plates, which must be round, whose diameter should be the full size of the rails and about three-quarters of an inch in thickness. The center hole of the plate, which, although it should be made so nearly conformable to the tenons, yet such a variation should be observed as will necessarily bring first in contact the extreme end of the tenon against the plate, by means of which inclination every part of the bedstead will be closely and firmly drawn together proportionate to the tightness of the sacking and the weight that comes upon it. The ratchet-wheel and catch will also be applied in the mode as in the plan before mentioned.

The principles in the above specification are susceptible and intended to be applied to bedsteads of all kinds, (and also cribs,) whether made or unmade.

In addition to the above, it may be proper to state that the revolving rails may be most advantageously applied to single low-post bedsteads at least, both for its safety, cheapness, and convenience.

In single bedsteads the sacking bottom need only be attached to the two side rails, which, from its less or reduced surface, and the consequent less weight it will have to bear, it will be found can be made sufficiently tight by the application of the lever to the revolving rails, in which case expense of the pins, cord, and working of loop-holes in the sacking is rendered entirely unnecessary, and by means of this arrangement and disposition the head and foot rails, together with the head-board, may be joined in the middle and at each post, in which instance the whole bedstead can be

3415X instantly folded up precisely like a cot, thereby superseding the use of screws, plates, or any other possible method (known or unknown) that requires the taking down and putting up as practiced in all other plans heretofore or now in general use. A separate and independent frame may also be used, to which the revolving rails may be applied or otherwise.

PEREGRINE WILLIAMSON.

Witnesses:
WM. ELLIOTT,
ALFRED ELLIOTT.